Figure 1:
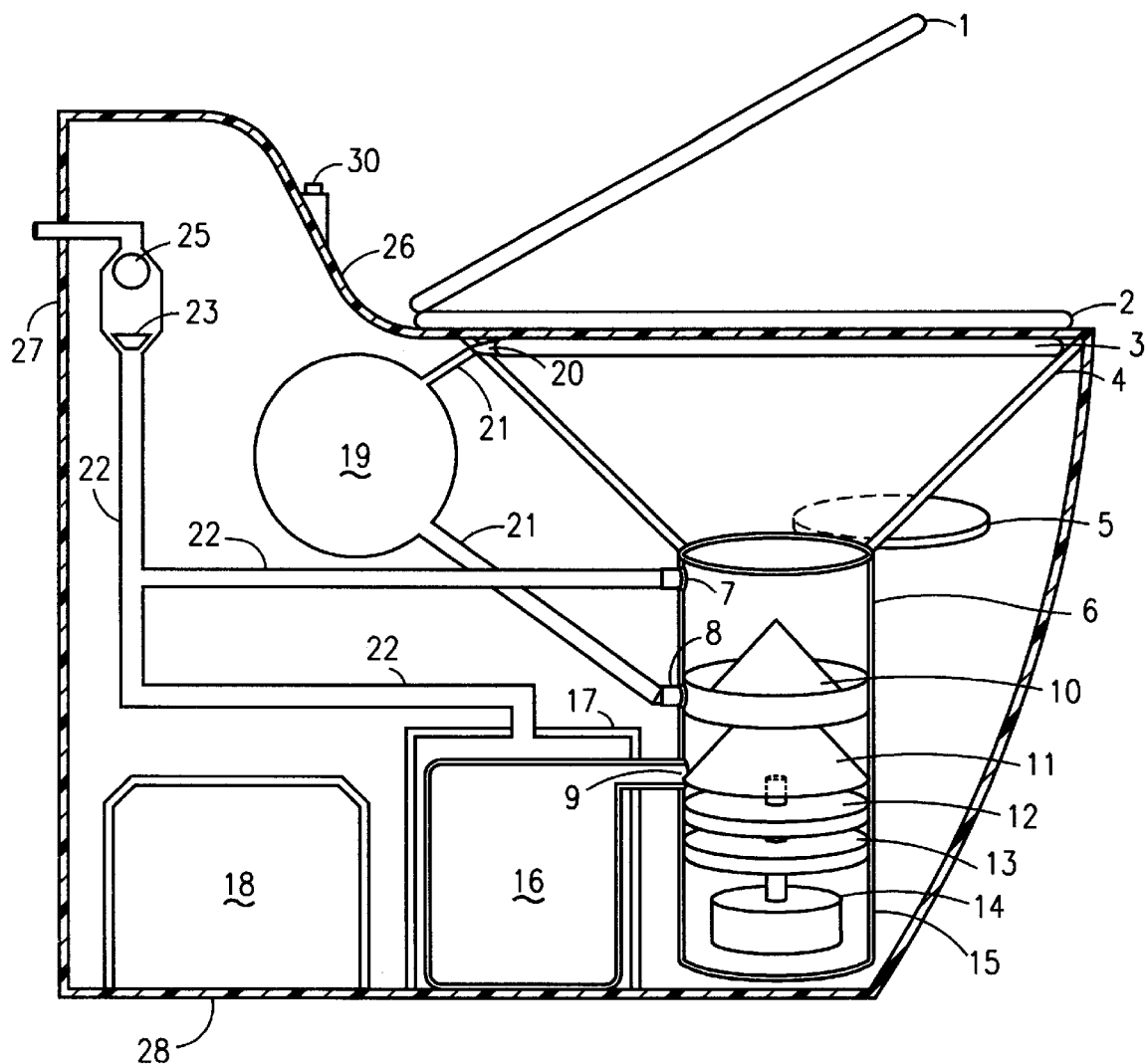
Figure 2:
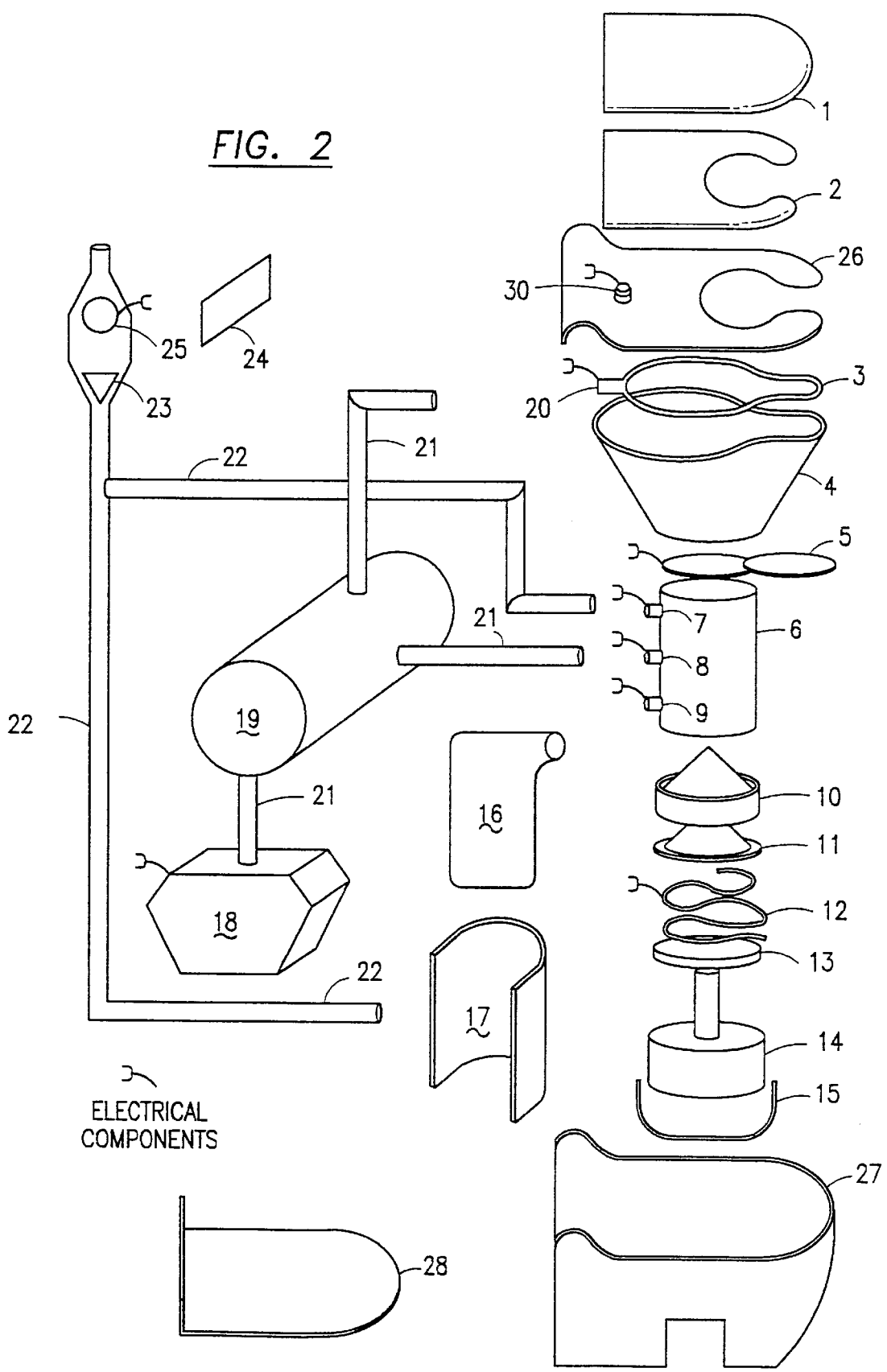

United States Patent [19]
Hammond

[11] Patent Number: 6,101,638
[45] Date of Patent: Aug. 15, 2000

[54] TOILET UTILIZING AIR PRESSURE, GRINDING AND HEAT TO PRODUCE A DRY POWDER WASTE

[76] Inventor: Warren Scott Hammond, 11305 Ellison Wilson Rd., North Palm Beach, Fla. 33408

[21] Appl. No.: 09/305,159

[22] Filed: May 4, 1999

[51] Int. Cl.[7] .................................................. A47K 11/02
[52] U.S. Cl. ............................................... 4/111.1; 4/471
[58] Field of Search .................................. 4/111.1, 111.2, 4/471, 472, 319, 320, DIG. 18, 111.4, 111.5, 111.6

[56] References Cited

U.S. PATENT DOCUMENTS

| | | | |
|---|---|---|---|
| 3,936,888 | 2/1976 | Sturtevant | 4/111.1 |
| 4,364,130 | 12/1982 | Persson | 4/111.1 |
| 5,230,164 | 7/1993 | Kishi | 4/111.1 |
| 5,564,133 | 10/1996 | Kishi | 4/111.1 |

*Primary Examiner*—David J. Walczak
*Attorney, Agent, or Firm*—Malin, Haley & DiMaggio, P.A.

[57] ABSTRACT

A self-contained toilet that does not require water for operation and does not require chemicals for operation including a toilet bowl enclosure that is cleaned by compressed air pressure and provides for human waste to be forced down into a heat and grinding chamber that becomes closed off by a sliding door. The air pressure comes from an internal compressor and air tank which not only cleans the toilet bowl but is also used for forcing ventilation of odor and humidity while the evaporation and dehydration process is taking place and is further used to blow the dehydrated powder waste into a bag or holding area. The dehydration process can operate from one person while the toilet is being used by another; further the dehydration process can be interrupted repeatedly with other deposits of human waste and then resume operation until fully dehydrated. A humidity sensor is used to identify completion of the dehydration process which opens the valve to the powdered waste bag or containment area.

1 Claim, 2 Drawing Sheets

TOILET UTILIZING AIR PRESSURE, GRINDING AND HEAT TO PRODUCE A DRY POWDER WASTE

BACKGROUND OF THE INVENTION

1. Field of the Invention

This invention relates to toilets for disposing of human waste, in particular a toilet for human beings that does not consume water but eliminates liquid and solid human waste through dehydration, evaporation, and grinding, resulting in a sanitized disposable waste powder products.

2. Description of Related Art

The use of toilets is almost universal in today's society. Conventional toilets use anywhere from one to seven gallons of water each time the toilet is flushed, at least in most industrialized countries. The waste of water continues whether the human waste is liquid or solid. The net effect is a tremendous consumption of water throughout the United States and other industrialized countries.

Other environments are such that disposing of human waste in lakes and oceans and canals is on some cases prohibited and in other cases certainly undesirable as a way of eliminating human waste. Boats are a particular problem often with a direct dumping of human waste overboard into the surrounding waters. Thus, there exists in conventional toilet use and in certain environmental impact uses, the need for a toilet for disposing of human waste that does not consume water and that does not result in disposing of raw sewerage or raw human waste into the surrounding environment.

The present invention solves the problem by providing a toilet that dehydrates, sanitizes and reduces human waste to a safely disposable sanitized powder or ash that can be returned to the soil.

Another problem in some toilets is that they utilize very toxic chemicals such as hydrochloric acid or chlorine that is poured into a holding tank for purification purposes.

Oftentimes, the material can be ground up and treated with very undesirable toxic chemicals which themselves are harmful to the environment when the entire matter is released.

Other forms of disposing of sewerage and human waste includes the use of septic tanks which are common in many parts of the United States and which oftentimes result in an increased bacterial count of surrounding water supplies, especially during heavy rains and the like. Although many areas are trying to rid themselves of septic tanks, they are still quite common.

U.S. Pat. No. 4,999,930 issued Mar. 19, 1991 to Kishi et al shows a device for drying raw sewerage. The device employs a plurality of heat balls which are paddled around and which allow for some dehydration of sewerage. The system here requires a fairly inefficient array of chemical elements which attempt to dehydrate the waste materials.

U.S. Pat. No. 5,152,074 issued Oct. 6, 1992 also to Kishi, shows a similar device that utilizes conductive heating as the heating elements.

U.S. Pat. No. 5,218,724 issued Jun. 15, 1993 to Blankenship, shows an incinerator toilet with a removal catalyst container. One of the drawbacks of this device is that it uses pellets for reducing odor, which are inserted and removed for replacement.

U.S. Pat. No. 5,276,924 issued to Hachima, on Jan. 11, 1994, shows a method and apparatus for disposing of body waste that includes inductive heating.

The present invention overcomes the problems of the prior art by providing an extremely efficient toilet that uses a small amount of electrical energy for heating and dehydration and an efficient grinder for producing a powder-like substance that is sanitized for return to the environment without any water being utilized.

BRIEF SUMMARY OF THE INVENTION

A toilet for disposing of human waste safely and sanitary without the use of any water or chemicals; comprising an air compressor for toilet bowl cleaning as well as the venting of humidity and odors and further used for blowing the waste powder into a bag or holding area, an organic material grinder similar to a sink garbage disposal unit with an electric heating element contained therein the grinding unit for both grinding, evaporating and dehydrating the waste contents.

The toilet includes an air pressure pipe around and underneath the toilet seat and against the toilet bowl wall. This pipe provides holes around the perimeter and facing downwards where compressed air pressure is released from a pressured air tank for cleaning the toilet bowl walls and forcing the waste to the dehydration grinder chamber through the chambers open slide door by high velocity air streams.

The air compressor and air tank supply pipe is connected to the bowl cleaning air pipe and to the dehydration grinder chamber.

The dehydration grinder chamber includes the entry slide door and opening and three side port openings. The top port is for venting air pressure in the chamber to the roof vent through a damper. The center port is for introduction of air pressure to the chamber and the bottom port is for the removal of the powdered waste to a vacuum cleaner type bag or containment area.

The dehydration grinder chamber also includes a grinding and cutting blade which rotates above a domed heating plate. The plate is heated by an electric element from underneath the plate where the plate is insulated from the drive motor below. Additional heating elements may be used around the outside of the chamber to increase heat and speed the dehydration process. The heating element is to dry the human waste in the container. Alternatively, gas burners and/or the introduction of microwaves and/or other heating element may be used in the dehydration process.

The electric drive motor has a drive shaft that goes through the top of the motor, through the insulation, heating element and heating plate to operate and spin the grinder cutting blade.

The grinder chambers sliding door is always in the closed position when in use. The waste is deposited in the closed funnel bowl. The closed door can allow the dehydration grinder chamber to perform its operation from a previous patron while in use.

When a person has completed use of the toilet, the operation button is pushed. This opens the chamber door and releases compressed air from the air tank to the bowl cleaning pipe and forces the waste cleanly into the dehydration grinder chamber. The release of air tank pressure starts the air compressor. The air is then switched from the bowl cleaning pipe to the process chamber center port. The chamber door closes at this time venting the air through the upper vent port to the roof and this begins the dehydration and grinding process.

The grinder blade begins to rotate as the heating element comes on causing the waste to grind, evaporate and dehydrate to a dry powder.

During this process, the air pressure from the center port forces air through the upper port venting past the damper to the roof dissipating odor and humidity from the chamber.

When the humidity sensor detects the absence of moisture, the heater shuts off and the upper vent port closes and the lower bag port opens. This forces the air from the center port to push the dry powder into the dry containment bag or area. The containment bag allows air pressure to pass through it and exit to the roof vent pipe. After this ten second bag filling, the grinder shuts off and all ports close. The compressor continues until the tank is pressurized for fast release to the bowl cleaning pipe for the next user.

An indicator light will come on when it is time to empty the dry powder bag. The dehydration grinder chamber can hold multiple deposits on top of each other, at any time, even though the dehydration process was not completed and the waste was not dry enough for the bag.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 1 shows an exploded, side perspective view of the present invention.

FIG. 2 shows a side elevational view showing the present invention with the toilet lid open.

DETAILED DESCRIPTION OF THE INVENTION

Referring now to the drawings and in particular FIG. 1, the present invention is shown generally comprising a toilet cabinet 27 which has a top part 26 and a bottom part 28 with a side or front door accessing the dry waste bag 16 from its container 17. The toilet lid 1 and seat 2 sit upon the top of the cabinet where on the inside of the cabinet is an air pressure cleaning pipe 3 surrounded by a stain-resistant and non-stick surface funnel-shaped toilet bowl. The toilet bowl 4 has an opening at the bottom of the funnel bowl which has a sliding door 5 which operates to open and close the opening to the processing chamber 6. The chamber has three ports, the top vent port 7 goes to the damper 23 and then vents to the roof, the bottom bag port 9 also vents to the roof through the damper 23 but first goes through the dry bag 16 in its container 17 before venting. Inside chamber 6, are angled blades 10 and scraping blades 11, which are connected to grinding motor 14. Grinding motor 14 resides within motor chamber 15. Insulator 13 resides between heating coil 12 and grinding motor 14. The center air port 8 receives air pressure from the compressor 18 through the air tank 19 as does the bowl cleaning pipe 3. There are then two air intake ports; port one number 20 is for the bowl cleaning pipe 3 and port two number 8 is for the operating chamber 6. There are two vent ports: one number 7 vents from the top of the chamber and two number 9 vents through the dry bag 16 and container 17 to the vent damper 23 before going to the roof.

These four ports open and close in this order: (A) bowl cleaning air port 20 opens with sliding door 5 open, then cleaning air port 20 closes and; (B) chamber air port 8 and upper vent port 7 open with heat and grinding operating; upper vent port 7 closes and heating element shuts off and (C) chamber air port 8 remains open and bag port 9 open with grinder only operating; then chamber air port 8 and bag port 9 stop while upper vent port 7 remains closed and (D) all remaining open ports are then closed and unit is off except for the compressor that automatically stops with the tank air pressurized.

The air compressor 18 comes on when air pressure is released from the tank, and when a person pushes the toilet operations button 30 which opens the cleaning air port 20 and sliding door 5. The compressor 18 remains on until the final all closed port operation, when the air pressure shuts off the compressor 18.

For heating and grinding of the waste, both items come on until the humidity sensor 25 tells the heater 12 to shut off and the vent port 7 to close. This opens the bag port 9 for ten seconds then shuts all ports and stops the grinder with the air pressure shutting the compressor off.

The key features of this toilet invention is the use of no water or chemicals and the production of a dry powder waste that is deposited in a disposable bag. Other key features are low electrical power usage, durable components, simple repairing, attractive lightweight design and the low cost of product installation and operation.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A toilet for safely disposing of human waste without using water or chemicals and electrically producing a dry powdered by-product comprising:

a toilet bowl;

an air nozzle directing air into said bowl;

a heater for heating said waste;

a grinder for grinding said waste into a powder, said grinder connected to said toilet bowl; and a receptacle for recovering said powdered waste.

* * * * *